(12) United States Patent
Nitta (10) Patent No.: US 9,430,249 B2
(45) Date of Patent: Aug. 30, 2016

(54) IMAGE FORMING APPARATUS, MEMORY ACCESS CONTROL METHOD, AND NON-TRANSITORY COMPUTER-READABLE RECORDING MEDIUM THAT PERFORM EFFICIENT MEMORY ACCESS CONTROL

(71) Applicant: KYOCERA Document Solutions Inc., Osaka (JP)

(72) Inventor: Kenichiro Nitta, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 37 days.

(21) Appl. No.: 14/258,103

(22) Filed: Apr. 22, 2014

(65) Prior Publication Data

US 2014/0325200 A1    Oct. 30, 2014

(30) Foreign Application Priority Data

Apr. 25, 2013  (JP) .................................. 2013-093014

(51) Int. Cl.
*G06F 9/44* (2006.01)
*G06F 12/14* (2006.01)

(52) U.S. Cl.
CPC ........... *G06F 9/4406* (2013.01); *G06F 9/4405* (2013.01); *G06F 12/14* (2013.01)

(58) Field of Classification Search
CPC ................. G06F 21/575; G06F 21/53; G06F 2221/2105; G06F 9/4406; G06F 9/45533; G06F 9/441; G06F 9/4405; G06F 11/1417
See application file for complete search history.

(56) References Cited

U.S. PATENT DOCUMENTS

| 7,334,102 | B1 * | 2/2008 | Conway | G06F 9/526 711/151 |
| 2007/0245092 | A1 * | 10/2007 | Yeh | G06F 12/1458 711/147 |
| 2008/0148034 | A1 * | 6/2008 | Henry | G06F 9/4405 713/1 |

FOREIGN PATENT DOCUMENTS

JP           2011-159070 A      8/2011

* cited by examiner

*Primary Examiner* — Reginald Bragdon
*Assistant Examiner* — Thanh Vo
(74) *Attorney, Agent, or Firm* — James Judge (57) ABSTRACT

A memory access control system includes a plurality of operators, a first memory, and a second memory. The plurality of operators are configured to execute different arithmetic operations. The first memory has a shared region accessible from the plurality of operators. The second memory is configured to cause any one of the plurality of operators to access. One of the operators is configured to access the second memory to load required data and execute a process concurrently with loading data required for a separate other process to cause the first memory to hold the data required for the separate other process.

6 Claims, 9 Drawing Sheets

IMAGE FORMING APPARATUS, MEMORY ACCESS CONTROL METHOD, AND NON-TRANSITORY COMPUTER-READABLE RECORDING MEDIUM THAT PERFORM EFFICIENT MEMORY ACCESS CONTROL

CROSS-REFERENCE TO RELATED APPLICATION

This application is based upon, and claims the benefit of priority from, corresponding Japanese Patent Application No. 2013-093014 filed in the Japan Patent Office on Apr. 25, 2013, the entire contents of which are incorporated herein by reference.

BACKGROUND

Unless otherwise indicated herein, the description in this section is not prior art to the claims in this application and is not admitted to be prior art by inclusion in this section.

Some typical electronic devices include a multi-core processor with a plurality of cores (operator) ensuring parallel process. The multi-core processor is widely applied not only to an information processing apparatus such as a personal computer but also to an image forming apparatus such as a copying machine, a printer, and a multi-functional peripheral including a copying machine and a printer.

The typical image forming apparatus includes a panel display unit that executes an operation such as display of an operating state. A panel controller system for the control and a main controller system for controlling image formation are assigned to different cores in the multi-core processor.

In this typical image forming apparatus, access to a memory is similarly configured as a single-core processor.

For example, data used in the panel controller system and the main controller system are held in one flash memory. A plurality of cores access the flash memory via one memory controller.

In this case, from the aspect of processing efficiency, an exclusive control is required in access from the plurality of cores to the flash memory.

However, when accessing one flash memory via one memory controller, the plurality of cores cannot simultaneously access the flash memory. Therefore, an ordinary exclusive control cannot be applied as it is.

To solve this problem, there is one technique where an exclusive control among a plurality of CPUs needs not to be considered when executing deletion operation of a non-volatile memory by simple control.

However, this technique requires a plurality of flash memories and a plurality of memory controllers; therefore, there are problems of cost increase and complication of structure.

SUMMARY

A memory access control system according to an embodiment of the present disclosure includes a plurality of operators, a first memory, and a second memory. The plurality of operators are configured to execute different arithmetic operations. The first memory has a shared region accessible from the plurality of operators. The second memory is configured to cause any one of the plurality of operators to access. One of the operators is configured to access the second memory to load required data and execute a process concurrently with loading data required for a separate other process to cause the first memory to hold the data required for the separate other process.

These as well as other aspects, advantages, and alternatives will become apparent to those of ordinary skill in the art by reading the following detailed description with reference where appropriate to the accompanying drawings. Further, it should be understood that the description provided in this summary section and elsewhere in this document is intended to illustrate the claimed subject matter by way of example and not by way of limitation.

DETAILED DESCRIPTION

Example apparatuses are described herein. Other example embodiments or features may further be utilized, and other changes may be made, without departing from the spirit or scope of the subject matter presented herein. In the following detailed description, reference is made to the accompanying drawings, which form a part thereof.

The example embodiments described herein are not meant to be limiting. It will be readily understood that the aspects of the present disclosure, as generally described herein, and illustrated in the drawings, can be arranged, substituted, combined, separated, and designed in a wide variety of different configurations, all of which are explicitly contemplated herein.

An object of ensuring processing efficiency while reducing an increase of the number of memories even without taking the exclusive control into consideration is achieved by the following method. One of a plurality of operators accesses an accessible second memory, loads required data during the access, and executes a process. One of the operators also loads data required for a separate other process and causes a first memory to hold the data.

First Embodiment

Image Forming Apparatus

Figure 1:
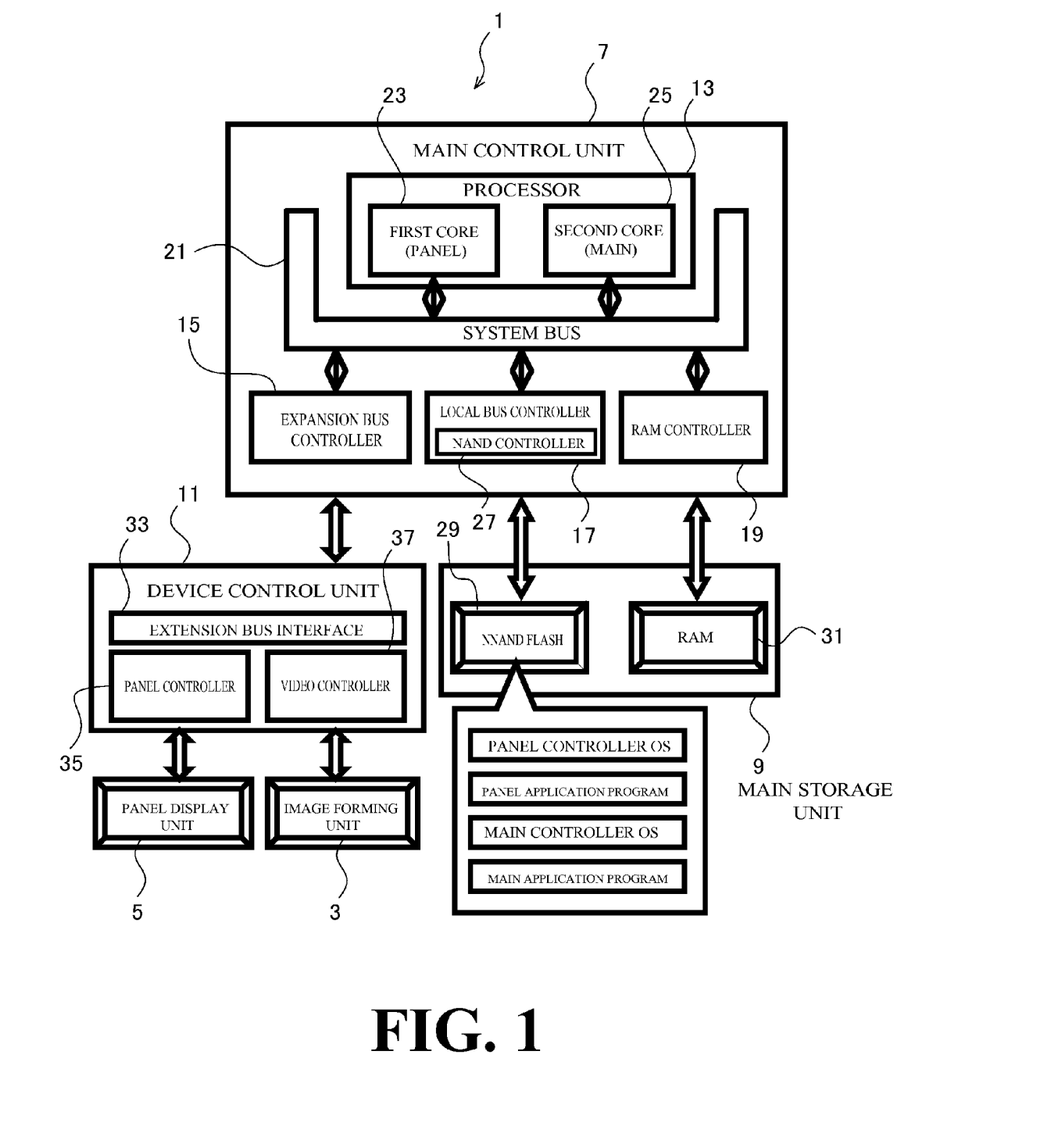
FIG. 1 is a schematic diagram illustrating a block configuration of an image forming apparatus according to a first embodiment.

FIG. 1 is a schematic diagram illustrating a block configuration of an image forming apparatus. An image forming apparatus 1 in FIG. 1 is, for example, a copying machine, a printer, or a multi-functional peripheral including a copying machine and a printer. The image forming apparatus 1 includes an image forming unit 3 and a panel display unit 5. The image forming unit 3 forms an image on a paper sheet based on input data. The panel display unit 5 is configured with a touch panel type liquid crystal screen or a similar screen. The panel display unit 5 displays an operation input to the image forming apparatus 1 and display of an operating state of the image forming apparatus 1.

This image forming apparatus 1 includes a main control unit 7, a main storage unit 9, a device control unit 11, or a similar unit. The image forming unit 3 and the panel display unit 5 are controlled in parallel.

The main control unit 7 is, for example, configured as a System-on-a-chip (SoC). The main control unit 7 includes a processor 13, an expansion bus controller 15, a local bus controller 17, and a RAM controller 19 on the same semiconductor chip. Each unit is connected with a system bus 21.

The processor 13 is configured with a multi-core processor. The processor 13 includes a first core 23 and a second core 25 as a plurality of operators. The first core 23 configures a panel controller system, which controls the panel display unit 5, by execution of a program. The second core 25 configures a main controller system, which mainly controls the image forming unit 3, by execution of a program.

The expansion bus controller 15 is a Peripheral Component Interconnect Express (PCIe) controller. The expansion bus controller 15 configures a root complex to the device control unit 11 and inputs and outputs data.

The local bus controller 17 is a controller for controlling a local bus and includes a NAND controller 27. The NAND controller 27 is a NAND type memory controller that reads/write data from/to a NAND flash 29.

The RAM controller 19 is configured with a Double-Data-Rate Synchronous Dynamic Random Access Memory (DDR-SDRAM) controller. The RAM controller 19 is a memory controller for DDR-SDRAM that inputs and outputs data to/from a Read only Memory (RAM) 31.

The main storage unit 9 includes the NAND flash 29, which is a first memory, and a RAM 31, which is a second memory.

The NAND flash 29 is a NAND type flash memory. The NAND flash 29 holds programs for various types of controls of the image forming apparatus 1 or a similar program. To this NAND flash 29, only a single core is accessible via the NAND controller 27. That is, a plurality of cores cannot access the NAND flash 29 simultaneously.

The NAND flash 29 holds a boot loader for startup, a panel controller operating system (hereinafter referred to as a "panel controller OS"), panel application program, a main controller operating system (hereinafter referred to as a "main controller OS"), main application program, and a similar program as programs for panel controller system and main controller system.

The RAM 31 is configured with DDR-SDRAM. The RAM 31 is used as a work area or a similar area for temporarily storing programs and various data.

The device control unit 11 is configured as an Application Specific Integrated Circuit (ASIC). The device control unit 11 includes an extension bus interface 33, a panel controller 35, and a video controller 37.

The extension bus interface 33 is a PCIe bus interface. The extension bus interface 33 inputs and outputs data serving as an end point for the expansion bus controller 15 at the main control unit 7 side.

The panel controller 35 executes an actual control on the panel display unit 5 based on input data by control by the panel controller system. The video controller 37 executes an actual control on the image forming unit 3 based on input data by control by the main controller system.

Thus, with the image forming apparatus 1 of this embodiment, the first core 23 and the second core 25 respectively configure the panel controller system and the main controller system. This ensures controlling the panel display unit 5 and the image forming unit 3 in parallel.

Memory Access Control System

Figure 2:
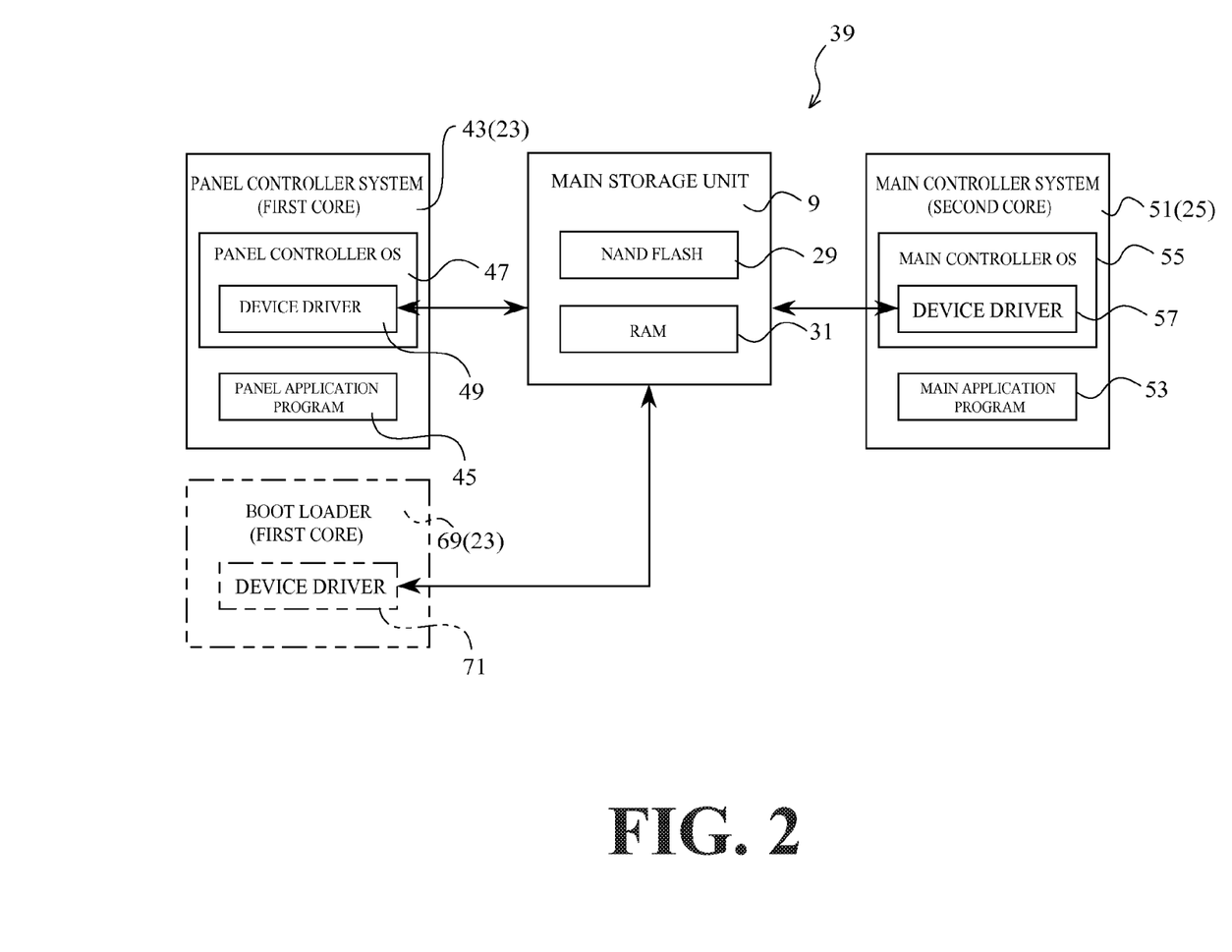
FIG. 2 is a schematic diagram illustrating a block configuration of a memory access control system applied to the image forming apparatus according to the first embodiment.

FIG. 2 is a schematic diagram illustrating a block configuration of the memory access control system applied to the image forming apparatus in FIG. 1. A memory access control system 39 in FIG. 2 executes a memory access control of the first core 23 and the second core 25 to the NAND flash 29 in the main storage unit 9 in the above-described parallel control and boot process at system start. This embodiment describes a memory access control in the boot process.

The first core 23 configures a panel controller system 43 as described above. The first core 23 causes various types of panel application programs 45 required for controlling the panel display unit 5 to be operated on a panel controller OS 47. This panel controller OS 47 includes a device driver 49 that controls the NAND flash 29.

The second core 25 configures a main controller system 51 as described above. The second core 25 causes various types of main application programs 53 required for controlling the image forming unit 3 to be operated on a main controller OS 55. Similarly to the panel controller OS 47, the main controller OS 55 also includes a device driver 57 that controls the NAND flash 29.

These panel controller OS 47 and main controller OS 55 are started during the boot process by a boot loader 69 at the system start of the image forming apparatus 1.

The boot loader 69 is configured by executing a program in the NAND flash 29 or a similar memory by the first core 23. The boot loader 69 includes a device driver 71 that controls the NAND flash 29.

Figure 3:
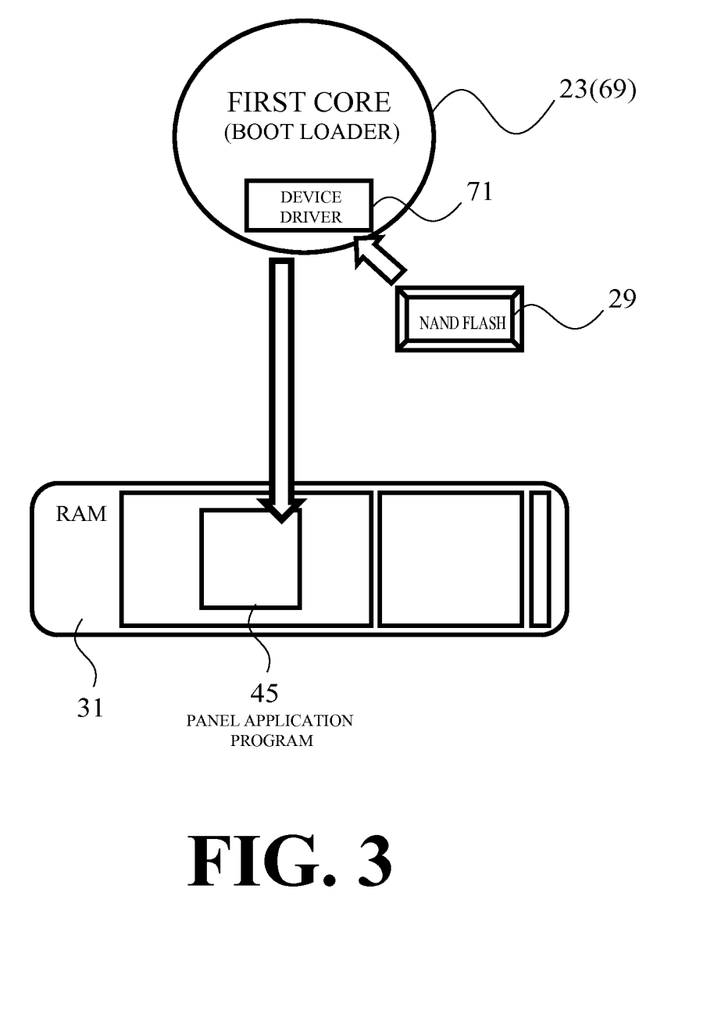
FIG. 3 is a schematic diagram illustrating a concept of loading a panel application program by the memory access control system according to the first embodiment.

Via the device driver 71, the boot loader 69 reads a panel startup program and a main startup program respectively required for starting the panel controller OS 47 and the main controller OS 55 from the NAND flash 29 on the RAM 31. At this time, the boot loader 69 also loads the panel application program 45 on the RAM 31 together with the panel startup program. The schematic diagram of a concept of loading the panel application program 45 is illustrated in FIG. 3.

The panel startup program is a panel kernel program, a panel device tree program, and a similar program as a part of a panel controller OS. The main startup program is a main kernel program, a main device tree program, and a similar program as a part of a main controller OS (see FIG. 5).

The boot loader 69 causes the first core 23 to start the panel controller OS 47 with the loaded panel startup program. The boot loader 69 causes the second core 25 to start the main controller OS 55 with the loaded main startup program.

As this startup, the first core 23 initializes the panel controller OS 47, and then loads the panel application program 45, while the second core 25 initializes the main controller OS 55, and then loads the main application program 53. The panel application program 45 is read from the RAM 31 while the main application program 53 is read from the NAND flash 29.

Figure 4:
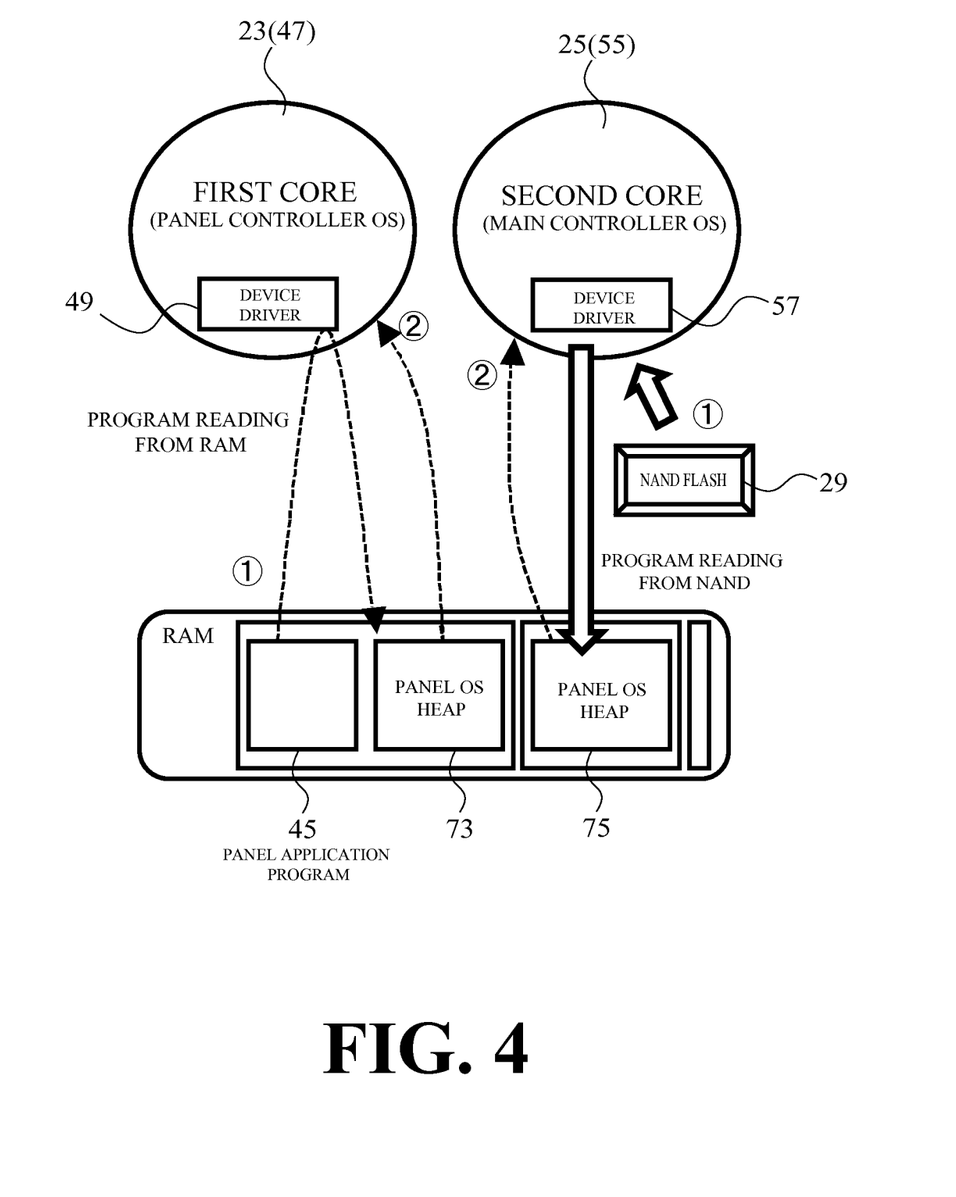
FIG. 4 is a schematic diagram illustrating a concept of loading data by the memory access control system according to the first embodiment.

FIG. 4 is a schematic diagram illustrating a concept of loading data from the RAM and the NAND flash. The first core 23 includes the device driver 49 for the RAM 31 by the started panel controller OS 47. The first core 23 employs the RAM 31 as a RAM disk for the panel application program 45.

Specifically, the first core 23 loads the panel application program 45 in the RAM 31 onto a panel OSHeap 73 in the same RAM 31 through control of the device driver 49 and executes the panel application program 45. This ensures omitting access to the NAND flash 29 in loading of the panel application program 45.

That is, this eliminates the NAND access by a demand-paging at the panel controller OS 47, thus preventing the NAND-exclusive waiting from occurring at the main controller OS 55.

Figure 5:
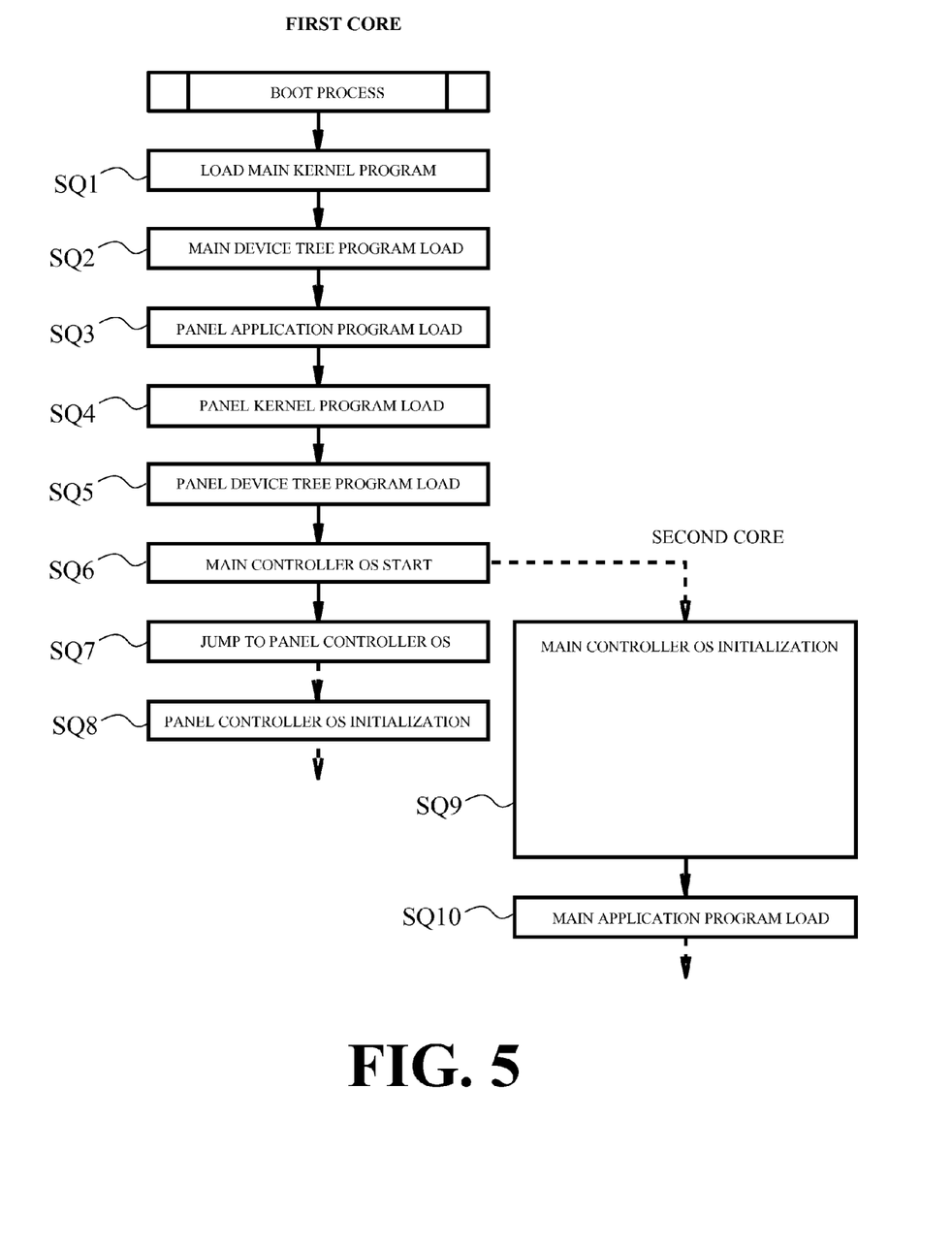
FIG. 5 is a sequence diagram illustrating a boot process by the memory access control system according to the first embodiment.

Consequently, in this embodiment, the panel application program 45 is loaded concurrently with initialization of the main controller OS 55 in the second core 25 (see FIG. 5).

The second core 25 includes the device driver 57 for the NAND flash 29 by the started main controller OS 55. The second core 25 accesses the NAND flash 29, loads data required for processing the main application program 53 or similar data to a main OSHeap 75 on the RAM 31 and executes the software.

FIG. 5 is a sequence diagram illustrating a boot process by the boot loader in FIG. 2. As illustrated in FIG. 5, the boot loader 69 executed on the first core 23 sequentially loads the main kernel program, which is a main startup program, first and then the main device tree program (SQ1 and SQ2).

Next, as described in FIG. 3, the boot loader 69 reads and holds the panel application program 45 on the RAM 31 (SQ3).

Next, the boot loader 69 sequentially loads the panel kernel program, which is a panel startup program, and then the panel device tree program (SQ4 and SQ5).

Thus, the loading of the main startup program and the panel startup program is completed. Then, the boot loader 69 causes the main controller OS 55 to start on the second core 25, jumps to the panel controller OS 47, and causes the panel controller OS 47 to start on a first core 23A (SQ6 and SQ7).

Accordingly, the first core 23 initializes the panel controller OS 47, and the second core 25 initializes the main controller OS 55 (SQ8 and SQ9).

After initialization of the panel controller 35, as described above, in parallel with the initialization of the main controller OS 55, the first core 23 loads the panel application program 45 in the RAM 31 onto the panel OSHeap 73 in the RAM 31 and executes the panel application program 45 (see FIG. 4).

On the other hand, the second core 25 accesses the NAND flash 29 after initialization of the main controller OS 55 as described above, loads data required for processing the main application program 53 or similar application programs on the RAM 31 and executes the application programs (SQ10 and see FIG. 4).

Effects of the First Embodiment

The memory access control system 39 of this embodiment includes the first core 23, the second core 25, the RAM 31, and the NAND flash 29. The first core 23 and the second core 25 ensure executing different arithmetic operations. The RAM 31 has the shared region 63 accessible from the first core 23 and the second core 25. Any one of the first core 23 and the second core 25 can access the NAND flash 29. In the memory access control system 39, the first core 23 accesses the NAND flash 29, loads required data (a panel startup program), executes a process, loads data required for a separate other process, and causes the RAM 31 to hold the data (the panel application program 45).

In view of this, in this embodiment, while the second core 25 is accessing the NAND flash 29, the first core 23 can execute a process with the data held in the RAM 31.

As a result, in this embodiment, even without taking the exclusive control into consideration, the NAND flash 29 can be efficiently used and waiting time of each core or similar time can be reduced, thus achieving processing efficiency while reducing an increase of the number of memories.

In the memory access control system 39 of this embodiment, the first core 23A functions as the boot loader 69 and accesses the NAND flash 29. The first core 23A loads the panel side and the main startup programs required for the panel controller OS 47 and the main controller OS 55 and executes the starting process. Additionally, the first core 23A loads the panel application program 45 required for a process separated from the starting process and causes the RAM 31 to hold the panel application program 45.

In view of this, in this embodiment, the NAND flash 29 can be efficiently used and waiting time of each core can be reduced also at the starting processes of the panel controller OS 47 and main controller OS 55. This achieves processing efficiency while reducing an increase of the number of memories. Consequently, this also provides an effect of shortening startup time.

In particular, in this embodiment, the panel application program 45 can be read from the RAM 31 concurrently with initialization of the main controller OS 55 by the second core 25. This reliably ensures efficient use of the NAND flash 29, reduction in waiting time of each core or similar time, and shortening of the startup time more.

Modification

Figure 6:
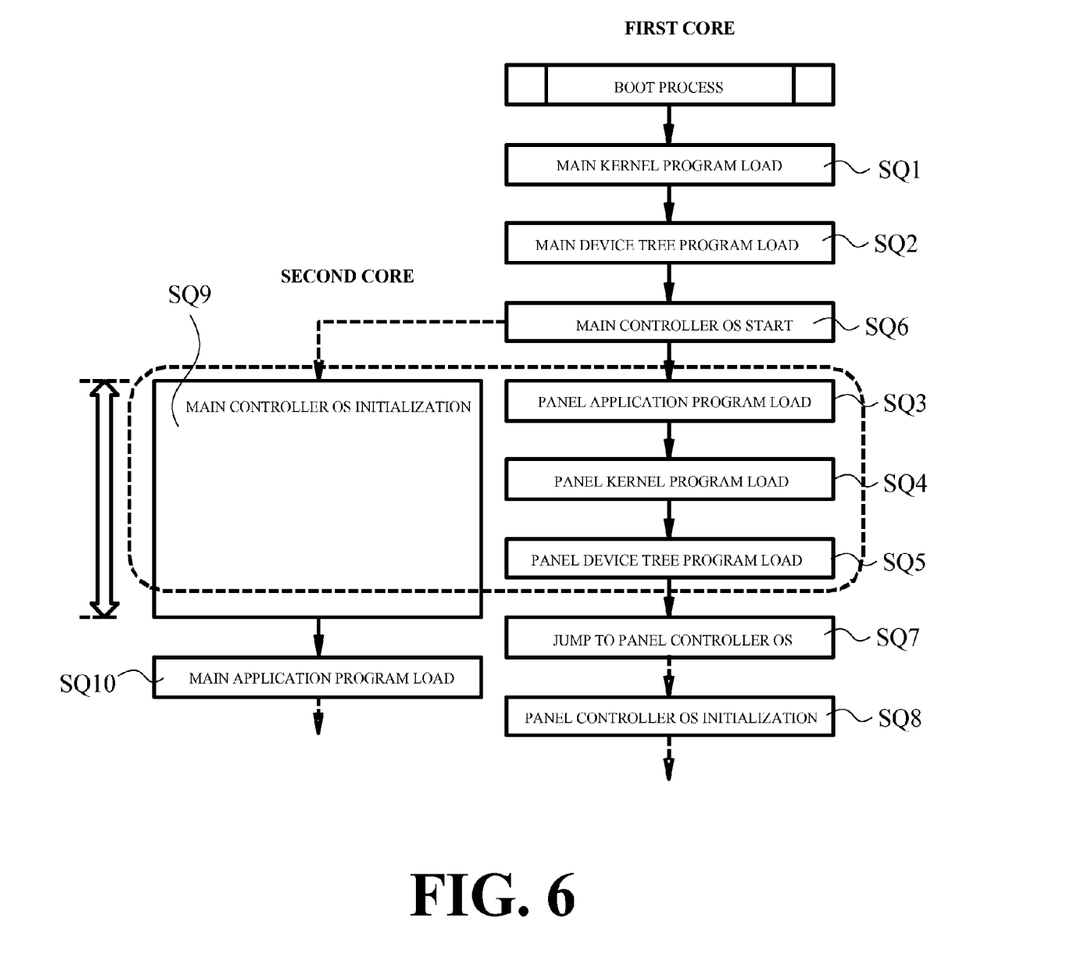
FIG. 6 is a sequence diagram illustrating a boot process by the memory access control system according to a modification of the first embodiment.

The sequence in FIG. 5 can be changed as shown in FIG. 6. FIG. 6 is a sequence diagram illustrating a boot process by a boot loader according to a modification.

In this modification, as shown in FIG. 6, the main controller OS 55 is initialized concurrently with the loading of the panel application program 45 and the panel startup program.

That is, after sequentially reading the main kernel program, which is a main startup program, and a main device tree program (SQ1 and SQ2), the main controller OS 55 is started (SQ6).

When the main controller OS 55 is initialized on the second core 25 (SQ9), concurrently with this, the panel application program 45 and the panel startup program are read (SQ3 to SQ5).

In initialization of the main controller OS 55, since many initialization processes of the kernel and each device driver are executed, there is much non-access time during which the NAND flash 29 is not accessed.

Using the non-access time, the boot loader 69 on the first core 23 can efficiently read the panel application program 45 and the panel startup program from the NAND flash 29.

Thus, the initialization of the main controller OS 55 is completed. Then, the second core 25 reads the main application program 53 (SQ10). On the other hand, the first core 23 jumps to the panel controller OS 47, causes the panel controller OS 47 to start (SQ7), and initializes the panel controller OS 47 (SQ8).

In the modification, the first core 23 causes the boot loader 69 to sequentially read the startup programs for the main controller OS 55 and the panel controller OS 47 and to execute the starting process. The second core 25 executes the starting process of the main controller OS 55 at least concurrently with the loading of the startup program for the panel controller OS 47 by the first core 23.

Accordingly, compared with the case where the OSes 47 and 55 for both the main and the panel are started after the all programs are read, time loss caused by waiting for starting the main controller OS 55 can be eliminated.

That is, in the modification, using the time of starting process of the main controller OS 55, in particular, the non-access time for initialization, the boot loader 69 on the first core 23 can efficiently read the panel startup program from the NAND flash 29. Besides, the modification can also achieve the operations and effects similar to the above-described first embodiment.

Second Embodiment

Figure 7:
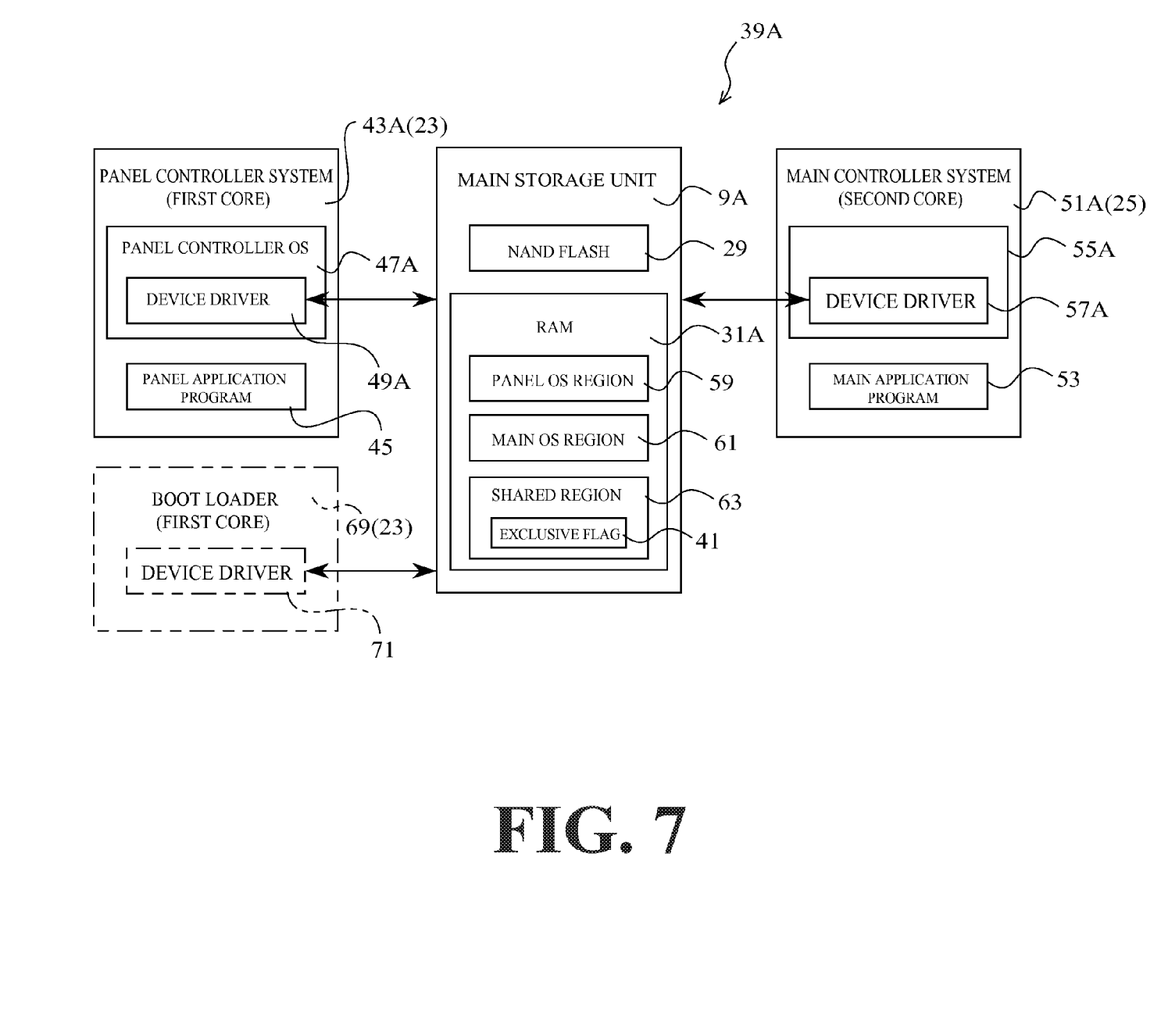
FIG. 7 is a schematic diagram illustrating a block configuration of the memory access control system applied to the image forming apparatus according to a second embodiment.
Figure 8:
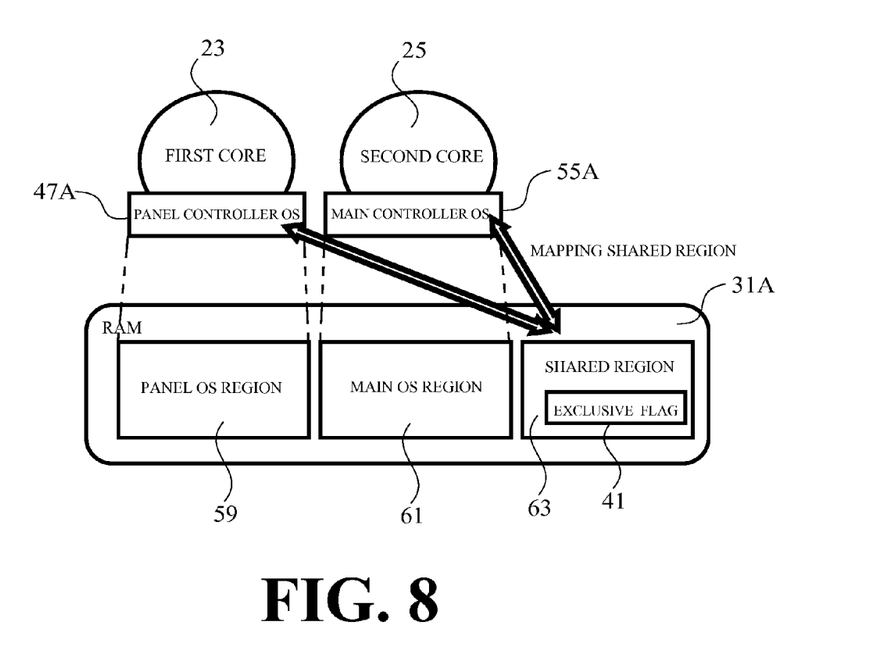
FIG. 8 is a schematic diagram illustrating a concept of relationship between a first core, a second core, and a RAM in the memory access control system according to the second embodiment.
Figure 9:
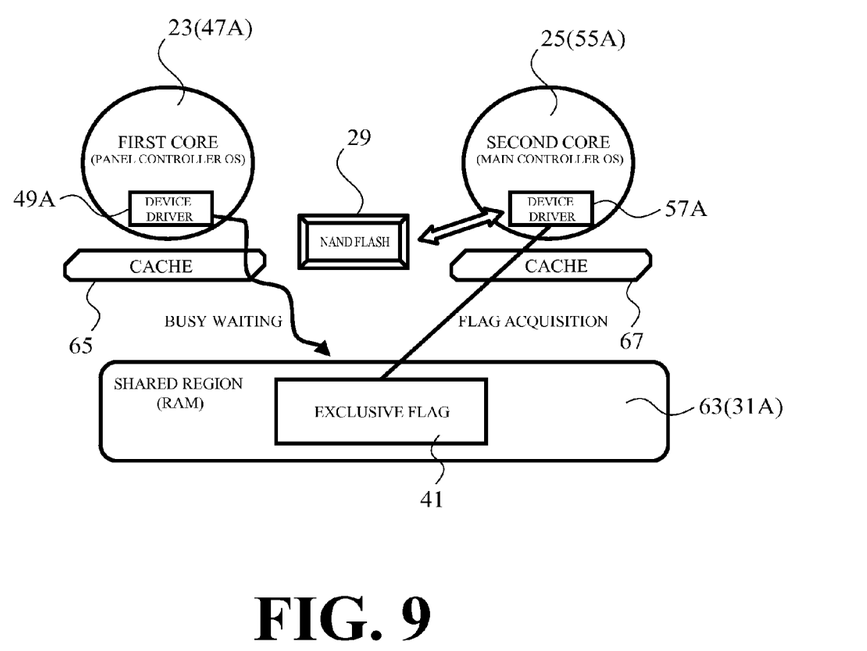
FIG. 9 is a schematic diagram illustrating a concept of a memory exclusive control in the memory access control system according to the second embodiment.

FIG. 7 is a schematic diagram illustrating a block configuration of a memory access control system applied to the image forming apparatus according to a second embodiment. FIG. 8 is a schematic diagram illustrating a conceptual of a relationship between the first core, the second core, and the RAM in the memory access control system in FIG. 7. FIG. 9 is a schematic diagram illustrating a conceptual of a memory exclusive control in the memory access control system in FIG. 7. Here, this embodiment has a basic configuration in common with the first embodiment. Therefore, like reference numerals or the same reference numerals with A are given to corresponding configurations, and the repeated description will be omitted correspondingly.

This embodiment combinedly use the exclusive control for the access to the NAND flash 29 by the first core 23 and the second core 25. The exclusive control of this embodiment is described in the case where an exclusive control is applied to a parallel control of a panel controller system 43A and a main controller system 51A. However, the exclusive control can also be applied to the boot process of the first embodiment.

As illustrated in FIG. 7 to FIG. 9, a memory access control system 39A holds an exclusive flag 41 in a RAM 31A in a main storage unit 9A. Only one of the first core 23 and the second core 25 that obtains the exclusive flag 41 executes the exclusive control that ensures access to the NAND flash 29 in the main storage unit 9A.

The first core 23 obtains the exclusive flag 41 in the RAM 31A via a device driver 49A in a panel controller OS 47A by spin lock. The second core 25 obtains the exclusive flag 41 in the RAM 31A via a device driver 57A in a main controller OS 55A by spin lock.

In the RAM 31A, a panel OS region 59 for the panel controller OS 47A, a main OS region 61 for the main controller OS 55A, and a shared region 63 for the panel controller OS 47A and the main controller OS 55A are allocated by mapping (FIG. 7 and FIG. 8). The exclusive flag 41 is held in the shared region 63 in the RAM 31A.

When one of the first core 23 and the second core 25 obtains the exclusive flag 41, the other cannot obtain the exclusive flag 41. Specifically, the first core 23 and the second core 25 monitor whether the exclusive flag 41 in the shared region 63 in the RAM 31A can be obtained or not. If obtainable, like the second core 25 in FIG. 9, the exclusive flag 41 is obtained. If not obtainable, like the first core 23 in FIG. 9, the first core 23 enters in a busy waiting state and continues monitoring the exclusive flag 41 while looping.

In this embodiment, the first core 23 and the second core 25 respectively have caches 65 and 67. With values in the caches 65 and 67, the respective first core 23 and the second core 25 monitor the exclusive flag 41 in the busy waiting state. In view of this, between the caches 65 and 67, and the RAM 31A, coherency is required, that is, data contents need to match. This can be achieved by flushing the caches 65 and 67, an invalidation process, or a similar process.

The exclusive flag 41 is obtained as follows. For example, after "one" is written at the moment when the exclusive flag 41 becomes "zero" by Read-Modify-Write and acquisition is ensured, writing "0" to the exclusive flag 41 opens the exclusive flag 41 or in a similar state. This exclusive flag 41 is obtained by Atomic operation (indivisible operation). From when exclusive flag information is "Read" and until being "Write", inconsistency due to "Write" from the other core is reduced.

One of the first core 23 and the second core 25 that obtains the exclusive flag 41 can access the NAND flash 29. In the example of FIG. 9, the second core 25 that has obtained the exclusive flag 41 can access the NAND flash 29.

Memory Exclusive Control

Figure 10:
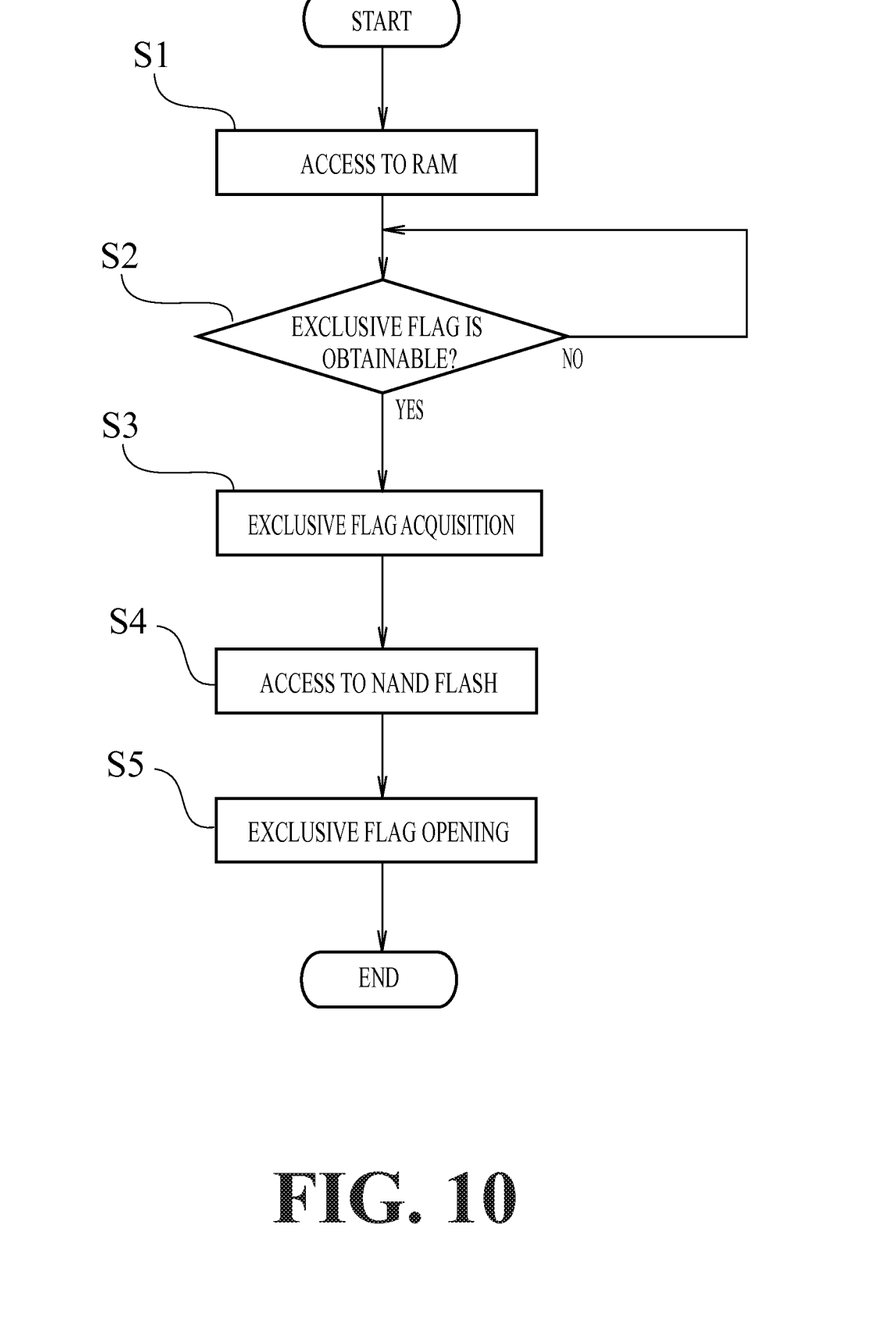
FIG. 10 is a flowchart of the memory exclusive control in the memory access control system according to the second embodiment.

The following describes a memory exclusive control of this embodiment with the flowchart in FIG. 10. The flowchart in FIG. 10 shows the memory exclusive control by the memory access control system in FIG. 7. For configurations of the image forming apparatus 1 and the memory access control system 39A, see FIG. 1 and FIG. 7 to FIG. 9.

First, the memory exclusive control executes "access to RAM" in Step S1. The first core 23 (the panel controller OS 47) or the second core 25 (the main controller OS 55) accesses the shared region 63 in the RAM 31A via control by the respective device driver 49A or 57A. This completes Step S1 and a process proceeds to Step S2.

In Step S2, an "exclusive flag is obtainable?" process is executed. In this process, the first core 23 or the second core 25 determines whether the exclusive flag 41 in the shared region 63 in the RAM 31A is obtainable or not.

In the example of FIG. 9, the second core 25 can obtain the exclusive flag 41 while the first core 23 cannot obtain the exclusive flag 41.

If the exclusive flag 41 is obtainable (YES), the process proceeds to Step S3. If not obtainable (NO), the process in Step S2 is repeated. If Step S2 is executed again, since the first core 23 or the second core 25 is in the busy waiting state, the first core 23 or the second core 25 continues monitoring the exclusive flag 41 on the cache 65 or 67 while looping.

In Step S3, "exclusive flag acquisition" is executed. That is, one of the first core 23 and the second core 25 obtains the exclusive flag 41 in the shared region 63 in the RAM 31A. This acquisition disables the other first core 23 or the second core 25 to obtain the exclusive flag 41.

In the example of FIG. 9, the second core 25 obtains the exclusive flag 41. Accordingly, as described in Step S2, the first core 23 cannot obtain the exclusive flag 41.

Thus, Step S3 is completed and the process proceeds to Step S4.

In Step S4, "access to NAND flash" is executed. That is, one of the first core 23 and the second core 25 that obtains the exclusive flag 41 accesses the NAND flash 29 via the NAND controller 27 (FIG. 1). Accordingly, one of the first core 23 and the second core 25 can read and write data from/to the NAND flash 29. In the example of FIG. 9, the second core 25 accesses the NAND flash 29 and reads and writes data.

Thus, Step S4 is completed and the process proceeds to Step S5.

In Step S5, "exclusive flag opening" is executed. When one of the first core 23 and the second core 25 terminates access to the NAND flash 29, the one of the first core 23 and the second core 25 releases the exclusive flag 41 in the shared region 63 in the RAM 31A. This causes the other first core 23 or second core 25 to obtain the exclusive flag 41. In the example of FIG. 9, the first core 23 in the busy waiting state now can obtain the exclusive flag 41.

Effects of Second Embodiment

In the memory access control system 39A of this embodiment, the RAM 31 holds the exclusive flag 41 in the shared region 63. If any one of the first core 23 and the second core 25 obtains the exclusive flag 41, the other core cannot obtain the exclusive flag 41. Thus, only one of the first core 23 and the second core 25 that obtains the exclusive flag 41 accesses the NAND flash 29.

Accordingly, in this embodiment, the exclusive control for the NAND flash 29 where a plurality of cores cannot simultaneously access can be executed easily and reliably. This ensures effective use of the NAND flash 29 and reduction in waiting time of each core or similar time.

The use of the exclusive control of this embodiment for the boot process of the first embodiment is advantageous in the case where the first core 23 loads and executes the panel application program 45 in the RAM 31A on the panel OSHeap 73 in the same RAM 31A as illustrated in FIG. 4 or in a similar case.

The first core 23 loads and executes the panel application program 45 in the RAM 31A without accessing the NAND flash 29. However, the first core 23 may access the NAND flash 29 and writes data in some cases.

During this writing, the first core 23 monitors the exclusive flag 41 and executes the above-described exclusive control. This ensures efficient use of the NAND flash 29, reduction in waiting time of each core or similar time, and shortening of the startup time.

The use of the exclusive control of this embodiment for the sequence in FIG. 6 of the first embodiment is advantageous in the case where the main controller OS 55 is initialized on the second core 25 (SQ9) concurrently with loading the panel application program 45 and the panel startup program onto the first core 23 (SQ3 to SQ5).

As described above, the boot loader 69 on the first core 23 reads the panel application program 45 and the panel startup program from the NAND flash 29 utilizing the non-access time to the NAND flash 29 during initialization of the main controller OS 55 on the second core 25.

In this respect, between the boot loader 69 and the main controller OS 55, the above-described exclusive control that monitors the exclusive flag 41 is executed. This ensures efficient use of the non-access time to the NAND flash 29. Therefore, this ensures efficient use of the NAND flash 29, reduction in waiting time of each core or similar time, and shortening of the startup time.

OTHERS

While the above-described embodiments employ a single multi-core processor as the processor 13, a configuration where, for example, a plurality of single-core processor and multi-core processor are combined appropriately can also be employed.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. An image forming apparatus comprising:
a panel display unit;
an image forming unit;
storage storing a panel application program for controlling the panel display unit and a main application program for controlling the image forming unit; and
a memory access control system comprising
a first core executing the panel application program to constitute a panel controller operating system,
a second core executing the main application program to constitute a main controller operating system,
a random-access memory including a shared region accessible through both the first core and the second core, and an excluding flag in the shared region, and
a NAND flash memory excludingly accessible by one of either the first core or the second core obtaining the excluding flag, the one of either the first or second cores having obtained the excluding flag thereby excluding the other of the first or second cores from obtaining the excluding flag;
wherein
the first core executes a boot loader, the first core accessing the NAND flash memory by executing the boot loader, and the first core causing the boot loader to sequentially load, from the NAND flash memory, a startup program for the panel controller operating system and for the main controller operating system, and the first core executing a starting process concurrently with loading an application program operating on the panel controller operating system to cause the random-access memory to hold the application program;
the second core executes a process of starting up the main controller operating system in parallel with at least loading of the startup program for the panel controller operating system by the first core;
the first core monitors whether it may obtain the excluding flag, and the second core monitors whether it may obtain the excluding flag;
the first core and the second core respectively have caches containing excluding-flag-monitoring data content matched with data content in the random-access memory;
if the first core is excluded from obtaining the excluding flag, the first core monitors the excluding flag according to the excluding-flag-monitoring data content in its cache while looping in a busy-waiting state, and if the second core is excluded from obtaining the excluding flag, the second core monitors the excluding flag according to the excluding-flag-monitoring data content in its cache while looping in a busy-waiting state; and
when one of either the first core or the second core accessing the NAND flash memory through having obtained the excluding flag terminates its access, the excluding flag is thereby released, such that the other core, being in the busy-waiting state, obtains the excluding flag.

2. The image forming apparatus according to claim 1, wherein one of either the first core or the second core executes a process according to data held in the random-access memory while the other core is accessing the NAND flash memory.

3. A memory access control method by an image forming apparatus including a panel display unit, an image forming unit, a random-access memory, a NAND flash memory, and storage storing a panel application program for controlling the panel display unit and a main application program for controlling the image forming unit, the memory access control method comprising:
   providing a first core and a second core;
   causing the first core to execute the panel application program to constitute a panel controller operating system; and
   causing the second core to execute the main application program to constitute a main controller operating system; wherein
   the random-access memory includes a shared region accessible through both the first core and the second core, and an excluding flag in the shared region;
   the NAND flash memory is excludingly accessible by one of either the first core or the second core having obtained the excluding flag thereby excluding the other of the first or second cores from obtaining the excluding flag;
   the method further comprises
      causing the first core to
         execute a boot loader and thereby access the NAND flash memory,
         cause the boot loader to sequentially load, from the NAND flash memory, a startup program for the panel controller operating system and for the main controller operating system, and
         execute a starting process concurrently with loading an application program operating on the panel controller operating system to cause the random-access memory to hold the application program,
      causing the second core to execute a process of starting up the main controller operating system in parallel with at least loading of the startup program for the panel controller operating system by the first core,
      causing the first core to monitor whether it may obtain the excluding flag, and causing the second core to monitor whether it may obtain the excluding flag, the first core and the second core respectively having caches containing excluding-flag-monitoring data content matched with data content in the random-access memory,
      if the first core is excluded from obtaining the excluding flag, causing the first core to monitor the excluding flag according to the excluding-flag-monitoring data content in its cache while looping in a busy-waiting state, and
      if the second core is excluded from obtaining the excluding flag, causing the second core to monitor the excluding flag according to the excluding-flag-monitoring data content in its cache while looping in a busy-waiting state; and
      when one of either the first core or the second core accessing the NAND flash memory through having obtained the excluding flag terminates its access, the excluding flag is thereby released, such that the other core, being in the busy-waiting state, obtains the excluding flag.

4. The memory access control method according to claim 3, further comprising causing one of either the first core or the second core to execute a process according to data held in the random-access memory while the other core is accessing the NAND flash memory.

5. A non-transitory computer-readable recording medium storing a memory access control program executed by a computer of an image forming apparatus, the image forming apparatus including a panel display unit, an image forming unit, a random-access memory, a NAND flash memory, and storage storing a panel application program for controlling the panel display unit and a main application program for controlling the image forming unit, the memory access control program causing the computer to function as:
   a first core executing the panel application program to constitute a panel controller operating system;
   a second core executing the main application program to constitute a main controller operating system; wherein
   the random-access memory includes a shared region accessible through both the first core and the second core, and an excluding flag in the shared region,
   the NAND flash memory is excludingly accessible by one of either the first core or the second core obtaining the excluding flag, the one of either the first or second cores having obtained the excluding flag thereby excluding the other of the first or second cores from obtaining the excluding flag,
   the first core executes a boot loader, the first core accessing the NAND flash memory by executing the boot loader, and the first core causing the boot loader to sequentially load, from the NAND flash memory, a startup program for the panel controller operating system and for the main controller operating system, and the first core executing a starting process concurrently with loading an application program operating on the panel controller operating system to cause the random-access memory to hold the application program;
   the second core executes a process of starting up the main controller operating system in parallel with at least loading of the startup program for the panel controller operating system by the first core;
   the first core monitors whether it may obtain the excluding flag, and the second core monitors whether it may obtain the excluding flag;
   the first core and the second core respectively have caches containing excluding-flag-monitoring data content matched with data content in the random-access memory;
   if the first core is excluded from obtaining the excluding flag, the first core monitors the excluding flag according to the excluding-flag-monitoring data content in its cache while looping in a busy-waiting state, and if the second core is excluded from obtaining the excluding flag, the second core monitors the excluding flag according to the excluding-flag-monitoring data content in its cache while looping in a busy-waiting state; and
   when one of either the first core or the second core accessing the NAND flash memory through having obtained the excluding flag terminates its access, the excluding flag is thereby released, such that the other core, being in the busy-waiting state, obtains the excluding flag.

6. The non-transitory computer-readable recording medium according to claim 5, wherein one of either the first core or the second core executes a process according to data held in the random-access memory while the other core is accessing the NAND flash memory.

* * * * *